(12) United States Patent
Prokop

(10) Patent No.: US 9,738,552 B2
(45) Date of Patent: *Aug. 22, 2017

(54) PROCESS FOR TREATING WASTE WATER UTILIZING AN AGITATED LIQUID AND ELECTRICALLY CONDUCTIVE ENVIRONMENT AND ELECTRO CHEMICAL CELL

(76) Inventor: Dan Prokop, Kingwood, TX (US)

( * ) Notice: Subject to any disclaimer, the term of this patent is extended or adjusted under 35 U.S.C. 154(b) by 1128 days.

This patent is subject to a terminal disclaimer.

(21) Appl. No.: 13/606,034

(22) Filed: Sep. 7, 2012

(65) Prior Publication Data

US 2013/0001172 A1  Jan. 3, 2013

Related U.S. Application Data

(63) Continuation-in-part of application No. 12/915,478, filed on Oct. 29, 2010, now Pat. No. 8,877,032.

(60) Provisional application No. 61/257,334, filed on Nov. 2, 2009, provisional application No. 61/532,359, filed on Sep. 8, 2011.

(51) Int. Cl.

| C02F 1/46 | (2006.01) |
|---|---|
| C02F 9/00 | (2006.01) |
| C02F 1/463 | (2006.01) |
| C02F 1/20 | (2006.01) |
| C02F 1/56 | (2006.01) |
| C02F 1/66 | (2006.01) |
| C02F 1/72 | (2006.01) |

(52) U.S. Cl.
CPC .................. *C02F 9/00* (2013.01); *C02F 1/20* (2013.01); *C02F 1/463* (2013.01); *C02F 1/56* (2013.01); *C02F 1/66* (2013.01); *C02F 1/72* (2013.01); *C02F 2201/4615* (2013.01); *C02F 2201/4617* (2013.01); *C02F 2201/4619* (2013.01); *C02F 2201/46145* (2013.01)

(58) Field of Classification Search
CPC .... C02F 1/463; C02F 9/00; C02F 1/20; C02F 1/56; C02F 1/66; C02F 1/72
See application file for complete search history.

(56) References Cited

U.S. PATENT DOCUMENTS

| 7,682,492 B2 * | 3/2010 | Bradley | .................. C02F 1/463 204/228.1 |
|---|---|---|---|
| 8,877,032 B2 * | 11/2014 | Prokop | .................. C02F 1/463 204/273 |

* cited by examiner

*Primary Examiner* — Arun S Phasge
(74) *Attorney, Agent, or Firm* — David McEwing

(57) ABSTRACT

A method and apparatus for treating waste water utilizing two energized agitated electrochemical reaction reactor units (each utilizing approximately 10 amps per gallon) with a reaction time of approximately 5 minutes wherein the first reaction vessel has a pH below 7 and a second reaction vessel has a pH of above the pH of the first reaction vessel and the effluent flows from a first agitated electrochemical reaction vessel to a degassing tank and then flows to a second agitated electrochemical reaction vessel and then to a flocculation tank.

10 Claims, 1 Drawing Sheet

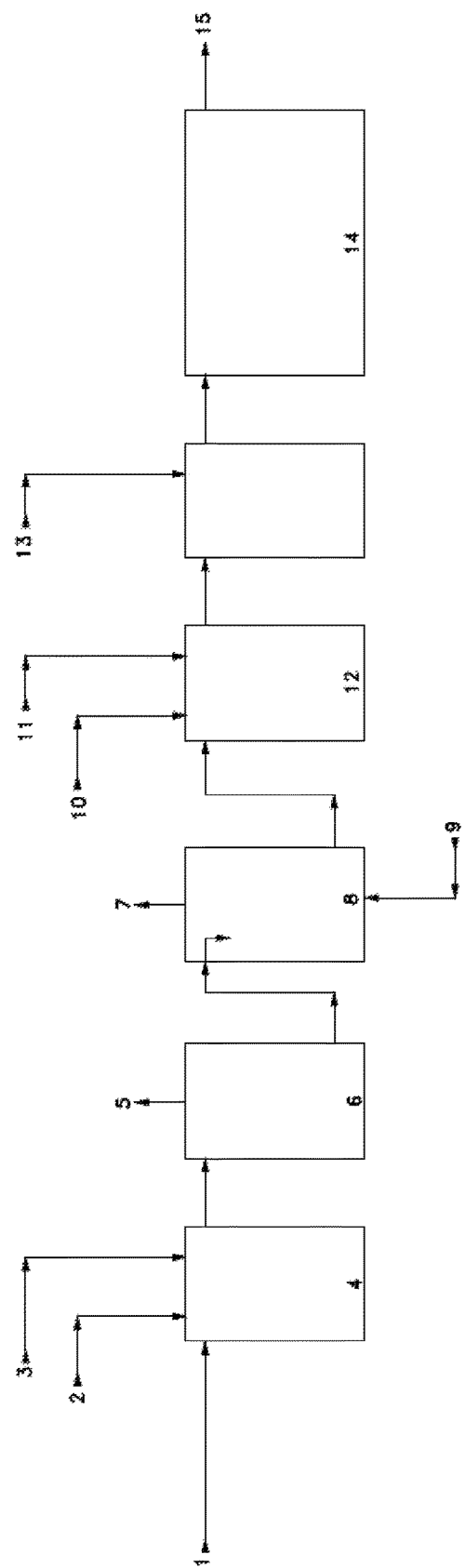

PROCESS FOR TREATING WASTE WATER UTILIZING AN AGITATED LIQUID AND ELECTRICALLY CONDUCTIVE ENVIRONMENT AND ELECTRO CHEMICAL CELL

RELATED APPLICATIONS

This application claims priority to, incorporates by reference herein, and is a continuation in part of application Ser. No. 12/915,478 entitled Generation of Chemical Reagents for Various Process Functions Utilizing an Agitated Liquid and Electrically Conductive Environment and an Electro Chemical Cell filed Oct. 29, 2010 now U.S. Pat. No. 8,877,032 and which claims priority to provisional application Ser. No. 61/257,334 entitled Generation of Chemical Reagents for Various Process Functions Utilizing an Agitated Liquid and Electrically Conductive Environment and an Electro Chemical Cell, filed Nov. 2, 2009 and which is incorporated by reference in its entirety herein. Priority is also claimed to provisional application No. 61/532,359 entitled Process For Treating Waste Water Utilizing an Agitated Liquid and Electrically Conductive Environment and Electro Chemical Cell filed Sep. 8, 2011 which is also incorporated by reference herein in its entirety.

BACKGROUND TO DISCLOSURE

Many process streams exist that require advanced chemical treatment. These streams range from potable drinking water to industrial process streams. Many industrial process streams contain a multitude of soluble compounds that require treatment by some process. This can include pretreatment before discharge or treatment of sufficient quality to reuse the contaminated water. The soluble compounds include but are not limited to arsenic, nitrates, organics, compounds in potable water as well as a list of a multitude of compounds dissolved in industrial process waters. These contaminants and the variety of contaminants make the process streams difficult to treat with conventional techniques. Additionally, many process production streams require specialized equipment. A multitude of treatments and process systems have been designed to treat the various streams described above. These range from conventional chemical treatment processes to ion exchange to electro coagulation devices. These processes have been implemented in various streams with varying degrees of success. All processes additionally have inherent limitations.

The process that is disclosed and described herein is a physical/chemical treatment configuration that has been developed to treat waters that contain high organic loadings in addition to highly suspended and dissolved solids of a non-organic nature. These streams have various originations including, but not limited to, wash waters, produced waters, flow back waters, fracturing water and other streams generated in the production, refining, transportation and distribution of organic based products.

The process disclosed herein utilizes the unique properties of the "Agitated Liquid and Electrically Conductive Environment and an Electro Chemical Cell" described in application Ser. No. 12/915,478 along with chemical treatment to produce process streams that have significantly reduced levels of the above mentioned materials.

Many process have been developed that implement chemical treatment, chemical and physical treatment, and electrocoagulation to accomplish the removal of organic and other solids from aqueous solutions.

SUMMARY OF DISCLOSURE

Process for treating waste waters that contain high organic materials, metals, suspended solids, colloidal particles and other dissolved materials utilizing an Agitated Electro Chemical Reagent Reactor. What is disclosed is a process and method for treating contaminated liquids with high levels of suspended, colloidal and dissolved solids. The process additionally provides for the reduction or elimination of emulsified materials. The source of this liquid, e.g., process water, can vary and may contain a vast array of contaminates. In one example, water from a hydro fracturing facility is produced as a byproduct of the process. This water cannot be released into the environment nor is of sufficient quality to reuse in additional fracturing operations. Currently water is sent to offsite facilities for deep well injection.

The process water is pumped (or gravity fed) to the agitated electrochemical reaction reactor (AECRR) at a controlled rate. The rate is defined by calculation and is determined based on the desired residence time in the reaction vessel. Material flows into the AECRR unit and is subjected the electrochemical conditions for the defined period of time. The pH of the AECRR unit is controlled at a low pH by the injection of a mineral acid. The pH of the AECRR unit can be variable depending on the contamination present, however in general the pH must be maintained below a pH of 5. The material then overflows by gravity (or can be transferred by pump on level control) to an additional tank that provides time for degas of the produced gases to occur.

In at least one embodiment, the material resides in the degasing tank for 10 minutes. Separation of organic material is seen in this process step. Accumulation of the organic phase is completed by skimming the surface of the degas tank. In addition, floc formation can be noted and is a result of the electrochemical reaction that has occurred in the previous step.

In this embodiment, material flows from the degas tank into a secondary packed bed degas tank. Material flows downward proximate to a packed bed and air is conveyed by a blower to the bottom of the packed bed. The packed bed disperses the upward moving air through the downward flowing effluent. Air stripping is utilized to reduce the bicarbonate alkalinity by stripping the material as $CO_2$. The rate is defined by calculation and is determined based on the desired residence time in the stripper vessel.

In this embodiment, material flows from the stripper tank into a secondary AECRR unit. The rate is defined by calculation and is determined based on the desired residence time in the reaction vessel. Material flows into the AECRR unit and is subjected the electrochemical conditions for the defined period of time. The pH of the AECRR unit is controlled at a pH that is higher than the pH of primary AECRR unit and the pH is adjusted by the injection of a base. The pH of the second AECRR unit can be variable depending on the contamination present. In general, however, the pH must be above the pH of the first reaction vessel.

The material then overflows by gravity (or can be transferred by pump on level control) to an additional tank that provides time for floc formation of the formed particles to occur. In one embodiment, the fluid is passed thought a small, highly agitated tank where polymer is injected to assist in the formation of solid particles.

Material resides in the formation tank for a period of time defined by the flow rate into the second reaction vessel. Once the material has been resident in the tank for this defined time period, the material flows to a separation vessel. In one embodiment, the separation vessel is a rectangular tank that contains a series of baffles. The baffles are configured in a manor to allow for a floatation zone, a settlement collection zone, and free water clear well. Once the fluid has passed over the floatation and settlement zones, the material resident in the final clear well is available for transfer out of the system. In another embodiment, the formation tank can be dimensioned to have a volume greater than the second reaction vessel. This larger volume slows the flow rate of the effluent facilitating the precipitation of solids and formation of floc.

This material can be directly recycled, pumped through ion exchange softening, or polished and transferred to a reverse osmosis unit. Due to the nature of the AECRR unit disclosed herein, chemical reagents can be added directly to the reaction vessel in which the electrochemical process is occurring. By the addition of chemicals during the electrochemical process with controlled or adjustable pH, significant benefits in treatment have been observed. These benefits include targeting pH ranges where certain contaminates have lower solubility. For example, by controlling the pH during a reaction, it is possible to achieve optimum conditions to enhance oxidation or reduction.

SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIG. 1 illustrates the effluent flow in one embodiment of the disclosure.

DETAILED DESCRIPTION OF THE DISCLOSURE

It is the intention of this disclosure to describe a method and process that can be utilized in the treatment of waters generated from processes that involve organic and other materials. This process can be directly applied to production waters (effluent) that result from drilling and hydro fracturing activities that are currently in use as well as other waters that are similar in nature. These waste waters or effluent can start the process having an opaque black appearance. The contaminants do not settle out of suspension. These effluents may contain various substances such as hydrochloric acid, glutaraldehyde, 2,2 Dibromo-3-nitriloprpionamide, peroxodisulfates methanol, potassium hydroxide, sodium acrylate, polyacrylamide, citric acid, thioglycolic acid, ammonium chloride, thylene glycol, polyaccrylate, methanol and isopropanol. The appearance of the treated effluent at the end of the process described in this disclosure is clear. This result is achieved by the addition of chemicals during the electrochemical process. The process subject of this disclosure will produce waters of sufficient quality that these waters can be returned for use in the hydro fracturing activities, or the water can be subjected to existing conventional water treatment techniques (softening, filtration, reverse osmosis, etc.) to produce water that can be reused or discharged.

What is disclosed is a process that utilizes an Agitated Electro Chemical Reagent Reactor (AECRR). In one embodiment, the AECRR comprises a multi-chambered vessel where each chamber is in liquid communication with the other. The effluent is added to the AECRR and mechanically agitated. The AECRR also contains an plurality of electrical charged plates through which the effluent flows. The plates are DC powered. In this process, production waters (aqueous feedstock or effluent) are transferred by pump or gravity to an AECRR unit of proper design. The effluent is mechanically agitated and circulated between electrically charged plates. The DC power consumed by the unit is approximately 10 amps per gallon with, in one embodiment, a reaction time of approximately 5 minutes within the cell consisting of electrically charged plates. It will be appreciated that the effluent is electrically conductive. The effluent enters the reactor where it undergoes the effects of the electrochemical generation unit or cell. While in the reaction vessel, a solution that is highly acidic (mineral acids) or a material that can produce an acidic environment (carbon dioxide) is injected into the vessel to facilitate a reduction in pH. In one embodiment the pH is lowered to below a pH of 5.

Due to the unique nature of the electrochemical generation unit, a defined pH is able to be maintained while the electrochemical process occurs. The unique feature of the electrochemical reactor is that the continuous agitation within the electrochemical reactor maintains the solution and reducing agents or oxidizing agents well mixed. In one embodiment, a continuous stream of oxidizing agents or reducing agents is added to the AECRR unit and the pH continuously monitored. It will be appreciated that the method and apparatus subject of this disclosure can treat a continuous stream of effluent.

The selection of the pH reducing agent is determined by the desired end product requirements, chemical availability, commercial impact, along with other considerations. This reduced pH in the presence of the electrochemical cell generates a highly oxidizing environment. This highly oxidizing environment facilitates the breakdown of materials that are contained in aqueous feed stock. Depending on the conditions, the injection of an additional oxidizing agent, e.g., hydrogen peroxide, chlorine, chlorine dioxide, may be added to speed the reactions. This increased reaction speed can reduce capital and operating costs. Selection of the materials of construction of the anodes and cathodes of the electrochemical cell within the AECRR is effluent stream dependent, but is normally iron based.

Typical reactions could include but are not limited to:

$Fe^{2+}+H_2O_2 \rightarrow Fe^{3+}+OH.+OH^-$-oxidizing $Fe^{3+}+H_2O_2 \rightarrow Fe^{2+}+OOH.+H^+$-oxidizing $H_2CO_3 \rightarrow CO_2+H_2O$-bicarbonate removal $Fe^{2+}+H_2O+O_2 \rightarrow Fe(OH)_3+H^+$-coagulant In one embodiment of the disclosure, effluent exits from the circulating flow of the first AECRR into a degasing process tank or organic separator that is designed to provide a reduction or slowing in the linear flow rate (gpm/ft^2) of the effluent. The reduction in linear flow rate provides time for gases generated in the first process step to rise to the surface of the effluent. As these gases rise, organic material is floated to the surface along with the gas. The floated material may be then skimmed from the surface of the degasing tank and is transferred to a storage tank for further treatment or recycle depending on the quality of the organic material. The gases include hydrogen (generated in the process), entrained air and carbon dioxide. The carbon dioxide can be generated if the production water contains high bicarbonate alkalinity.

The reduction in linear flow rate can be achieved by the use of baffles in the tank or by dimensioning the degassing process tank to have a larger volume than the reaction vessel.

It should be noted that in other embodiments, the addition of air into a secondary degassing tank or packed bed may be desirable if the feed water contains very high bicarbonate alkalinity or if the effluent alkalinity specification is quite low. The packing can be located at the bottom of the tank. It can be proximate to the effluent exit port on the tank. The packing can be stainless steel rings (inert) that allow for the surface area to be increased to affect better liquid air contact for stripping. The typical air flow is 2.5-4 SCFM air per GPM effluent. The removal of bicarbonate alkalinity is facilitated by the conversion of the bicarbonate alkalinity to $CO_2$ in the primary (first) reaction vessel. Air is pumped counter current through the bed to the effluent flowing in the secondary degassing tank. It will be appreciated that the diffused air stream is rising from the bottom while the effluent is flowing downward to the exit port. Insoluble materials that may have been generated in the first ACERR vessel (reaction vessel) may fall to the bottom of the degasing tank or may remain in solution depending on relative size and density.

Water flows (by pump or gravity) from the degasing tank into a second AECRR vessel (reaction vessel). The first and second reaction vessels are described in detail in application Ser. No. 12/915,478 which is incorporated herein by reference in its entirety. The first and second reaction vessels are constructed substantially in the same configuration. The water enters the second reaction vessel where it undergoes electrochemical reactions. In one embodiment, the effluent flows directly from the first reaction vessel to the second reaction vessel. The second reaction vessel can have an output port or passage for treated effluent.

The pH of the second reaction vessel is controlled at a higher pH than the first AECRR reaction vessel. Solution that is highly basic is injected into the vessel to facilitate an increase (and control) in pH (above the pH of the first reaction vessel). Due to the unique nature of the electrochemical reactor, a defined pH is able to be maintained while the electrochemical process occurs. The pH is maintained by the continuous agitation of the effluent and alkaline agents. There may be a continuous addition of reducing agents and the pH continuously monitored.

The pH set-point in the second AECRR reaction vessel is a function of the desired removal and end product requirements. The selection of the agent used to increase pH is determined by the desired end product requirements, chemical availability, commercial impact, along with other considerations. Examples of agents that are used to increase the pH include NaOH, KOH, MgOH, CaO, and $Ca(OH)_2$. Other agents can be considered and the disclosure is not limited to the listed examples. This increased pH in the presence of the electrochemical cell generates an environment that is conducive to flocculation and removal of divalent contaminants. Selection of the materials of construction of the anodes and cathodes is stream dependent, but is normally aluminum based.

Reactions can include but are not limited to the following:

$CO_3^{2-}+Ca^{2+} \rightarrow CaCO_3$-precipitant $CO_3^{2-}+Mg^{2+} \rightarrow MgCO_3$-precipitant $CO_3^{2-}+Ba^{2+} \rightarrow BaCO_3$-precipitant $Al(H_2O)_6^{3+}$-coagulant $Al(H_2O)_5OH^{2+}$-coagulant Partially treated effluent flows from the second AECRR vessel into an aging vessel. In this vessel, flocculants are formed prior to flow into a separation unit or vessel (for the formation/separation and removal of solids, i.e., formation/solids removal tank). If a secondary chemical coagulant is required, a small, fast mix zone will be required to facilitate the mixing of the secondary chemical in the aging vessel. The secondary coagulants include but are not limited to low, medium and high density anionic and cationic coagulants. In one embodiment, the coagulant is a medium molecular weight cation polymer. It can be mixed using a flash mixer, mixing tee or similar component.

Finally, material flows from the aging tank and exits to a separation unit. The separation unit provides for removal of solids from the top (float) and from the bottom (settlement) as both types of particles will be formed during the process. There are different types of devices that can be utilized in this process step including the use of conventional clarifiers, dissolved floatation units, lamella type clarifiers, as well as other devices not listed.

FIG. 1 illustrates a flow diagram of one embodiment of the disclosure. Illustrated is the inflow 1 of effluent into the first electrochemical reaction vessel 4. Also illustrated is the DC power input 2 into the first reaction vessel 4. The input of the oxidizing agent 3 such as acid is also illustrated. Removal of organics or solids 5 occurs in the organics separator. The effluent flows from the organics separator 6 to the packed stripper or packed bed 8 where $CO_2$ is removed by air 7 stripping. Air 9 is added from the bottom of the vessel and passes through inert material such as stainless steel rings that allow for the surface area to increase to affect better effluent air contact. It will be appreciated that the flow of air is against the flow of effluent. Note the exit port for the effluent is located in the lower section of the vessel.

The effluent enters the second electrochemical reaction vessel 12 whereas a base 11 is added to the effluent. Also added is the DC power input 10. Also illustrated is the input of polymer into a separate aging tank. This tank can have a mixer or agitation component such as a high speed mixer. Illustrated is the flow of effluent from this tank to the Formation/Solids Removal tank 14 and discharge of treated water. The Formation/Solids Removal tank may contain a mixer component such as a low speed mixer.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention maybe utilized independently of the use of other features, all as would be apparent to one skilled in the art after having the benefit of this description of the invention.

While specific embodiments have been illustrated and described, numerous modifications are possible without departing from the spirit of the invention, and the scope of protection is only limited by the scope of the accompanying claims.

What I claim is:

1. An apparatus for removing materials in solution from effluent comprising:
   a) a first vessel comprising a center section in liquid communication with an outer annular section wherein the effluent added to the vessel circulates between the center section and the outer annular section and one section contains an electrochemical reactor; and
   b) a second vessel in liquid communication with the first vessel receives treated effluent from the first vessel and the second vessel further comprises a center section in liquid communication with an outer annular section wherein the effluent circulates between the center section and the outer annular section and one section contains an electrochemical reactor.

2. The apparatus of claim 1 further comprising a third vessel positioned to receive effluent from the first vessel and to discharge the effluent into the second vessel.

3. The apparatus of claim 2 wherein the third vessel comprises an organic separator.

4. The apparatus of claim 2 further comprising a fourth vessel positioned between the third vessel and the second vessel wherein the fourth vessel receives effluent from the third vessel and discharges the effluent into the second vessel and the fourth vessel contains inert packing material and an air circulator through the inert material in a direction counter to an effluent flow.

5. The apparatus of claim 4 wherein the fourth vessel comprises a packed stripper or packed bed.

6. The apparatus of claim 1 further comprising a port or passage to add reactants to the effluent.

7. The apparatus of claim 6 further comprising an acidic reactant added to lower the pH of the effluent below 7 in the first vessel.

8. The apparatus of claim 6 wherein an alkynes reactant is added to the second vessel so that the pH of the effluent in the second vessel is greater than the pH of the effluent in the first vessel.

9. The apparatus of claim 1 wherein a fifth vessel is positioned to accept the discharge of effluent from the second vessel and the fifth vessel contains a port or passageway for the addition of polymer to the effluent.

10. The apparatus of claim 9 wherein a sixth vessel is positioned to accept the discharge of effluent from the fifth vessel and is dimensioned larger than the second vessel and solids form and settle in the sixth tank and treated effluent is discharged.

* * * * *